Aug. 4, 1931.  J. M. HEINRICH  1,817,410
MAGNETO ELECTRIC MACHINE
Filed March 27, 1930    2 Sheets-Sheet 1

INVENTOR
J. M. Heinrich
By Marks & Clerk
Attys.

Aug. 4, 1931.  J. M. HEINRICH  1,817,410
MAGNETO ELECTRIC MACHINE
Filed March 27, 1930  2 Sheets-Sheet 2
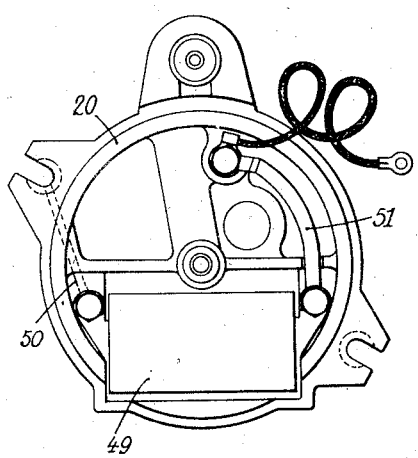
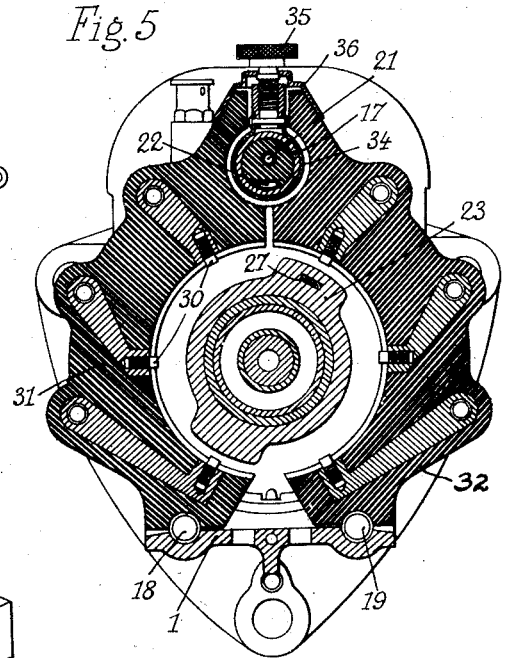
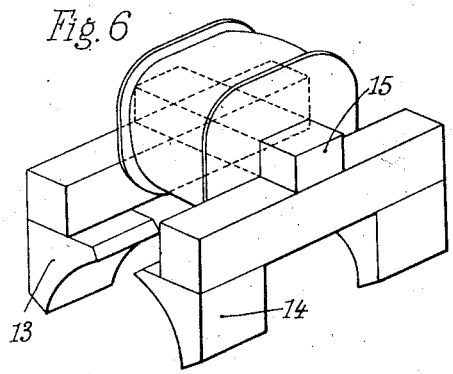
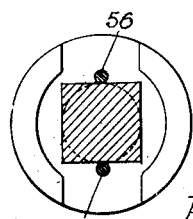
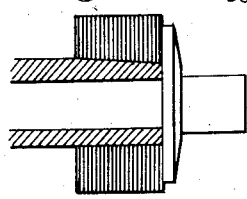
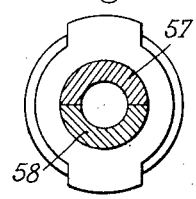
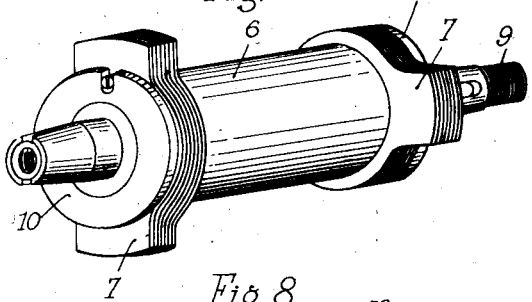
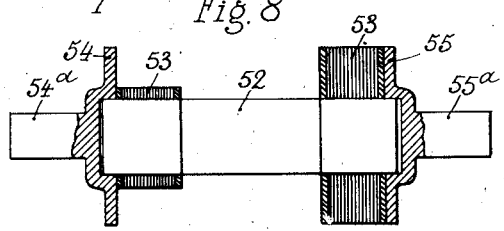
INVENTOR:
J. M. Heinrich
By Patented Aug. 4, 1931

1,817,410

UNITED STATES PATENT OFFICE

JEAN MARIE HEINRICH, OF PARIS, FRANCE, ASSIGNOR TO SOCIETE DES MOTEURS SALMSON, OF PARIS, FRANCE

MAGNETO ELECTRIC MACHINE

Application filed March 27, 1930, Serial No. 439,458, and in France April 13, 1929.

This invention relates to ignition magnetos for explosion engines, of the type comprising a rotating field magnet and a stationary armature.

In accordance with the invention, the distributor of the secondary current is rotatably mounted in the magneto frame with its axis out of alignment with the field magnet shaft and is actuated by the latter through the medium of a gearing of the inner wheel type.

This arrangement has the advantage that the construction is simplified and the dimensions of the machine are reduced.

Other features of the invention will result from the following specification.

In the appended drawings, given solely by way of example:

Fig. 4 is a view of the internal face of the cover of the box of the make-and-break devices;

Fig. 5 is a section on the line 5—5 of Fig. 1, showing the connection from the distributor to the outer terminals;

Fig. 6 is a perspective view showing the armature;

Fig. 7 is a perspective view of the field magnet;

Fig. 8 is a longitudinal section of a modification of the field magnet;

Fig. 9 is an end view corresponding to Fig. 8;

Figs. 10 and 11 show another modification of the field magnet.

Figure 1:
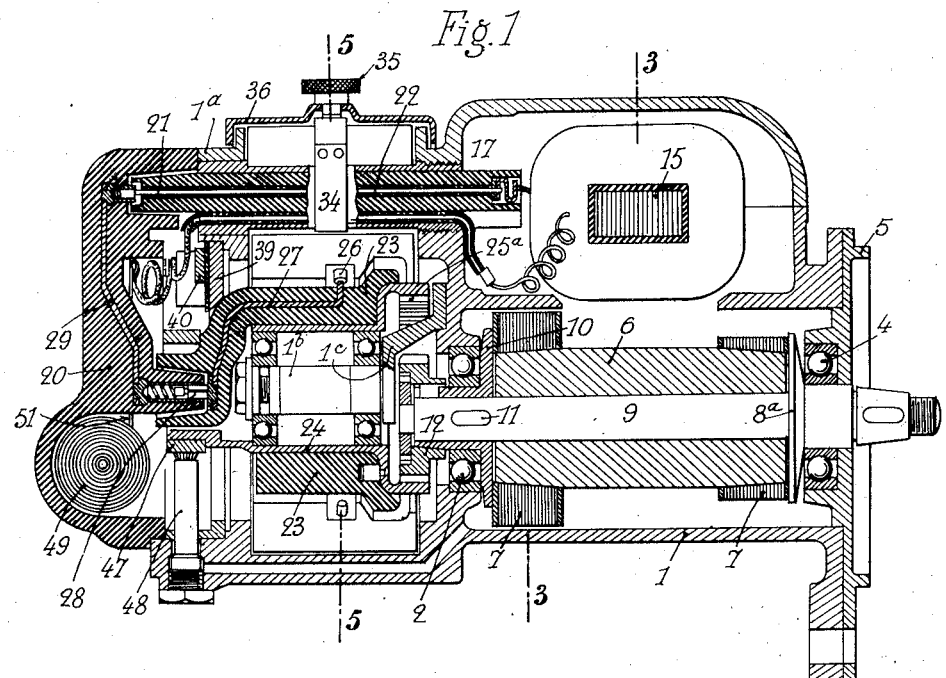
Fig. 1 is a longitudinal section of a magneto according to the invention.
Figure 2:
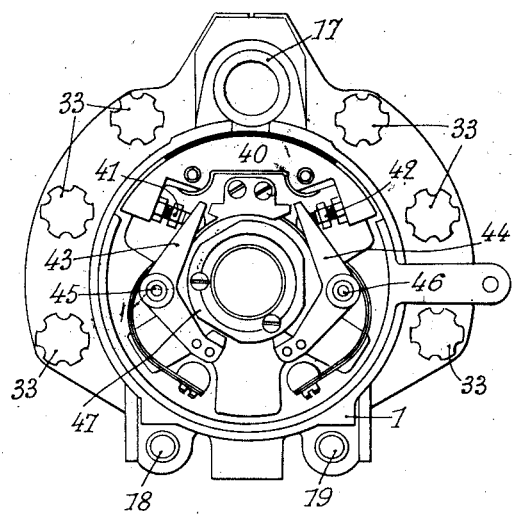
Fig. 2 is a front view, the cover of the box of the make-and-break devices being removed.
Figure 3:
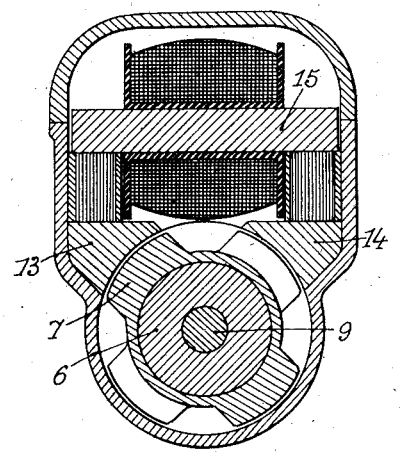
Fig. 3 is a cross section of Fig. 1, according to the line 3—3 of said figure.

According to the example of construction shown in Figures 1 to 7, the magneto consists of a frame or casing 1 of a nonmagnetic material provided with a bearing 2 for the shaft 9 of non-magnetic material, which is used to drive the rotating field magnet 6, the other bearing 4 of said shaft being placed in a cover 5. The field member 6 consists of a permanent magnet which has the form of a hollow cylindrical bar of suitable size to create the necessary magnetic flux. Upon the opposite conical ends of said bar are fitted the pole pieces 7 of a metal, laminated or not, having a good magnetic permeability. Said pole pieces are of suitable form and permit, according to their number of poles, to obtain two, four, six or eight variations of flux, and hence two, four, six or eight sparks per revolution of the field magnet.

The pole pieces 7 are clamped on the magnet 6 by means of two cheeks 8a and 10. The cheek 8a is integral with the shaft 9, the other cheek 10 is rotated by said shaft, for instance, by means of a key 11. On the hub portion of said cheek, is clamped a pinion 12 and the parts used for clamping the pinion 12 in position act also to clamp the cheek on the shaft. The aforesaid cheeks act to drive the magnet and to prevent all shifting of the poles. The shaft 9 may have an outer conical end to receive the driving member.

The frame of the armature consists of two bridge-pieces 13, 14 (Fig. 6) of a magnetic and preferably laminated metal, which are contained in the casing 1. The armature core 15, of similar construction, is, for example, screwed on said members 13, 14 and carries the primary and secondary windings which are concentrically wound.

The front portion 1a of the frame 1 is connected to the main body by a lower web and by cross-pieces 17, 18, 19 (Fig. 5). It is closed by a cover 20. The upper cross-piece 17, which is larger in diameter than the other two, serves for the passage of the secondary current to the brush holder 23 of the distributor by means of the connection 21, and of the primary current to the make-and-break devices 43, 44 by the connection 22. All external connections are thus avoided.

The brush holder 23 of the distributor is secured to a sleeve 24 forming the hub of an internally toothed wheel 25a which is driven by the aforesaid pinion 12 keyed to the end of the shaft 9 of the field magnet.

As shown in the drawings, the axis of the hub 24 of the wheel 25a is out of alignment with the axis of the rotating magnet 6 and said hub is centered by means of two ball bearings on a shaft 1b carried by the frame 1 through the medium of an arm 1c.

The brush 26 of the brush-holder 23 is connected by the connection 29 contained in the cover 20 and by the aforesaid connection 21, to the secondary winding of the armature. Said brush comes successively in relation with contact pieces 30 (Fig. 5) provided in the distributor body. Said distributor body consists of two semi-circular members 31 and 32 (Fig. 5) of insulating material arranged side by side and provided on their outer end face with terminals 33 (Fig. 2) (six in the example represented). The members 31 and 32 are held in position by means of a cap 36 (Fig. 5), a screw 35 and a collar or strap 34 (Figs. 1 and 5) surrounding the upper-cross-piece 17, the cap 36 acting to press the members 31, 32 of the distributor body upon the lower cross-pieces 18, 19 of the casing.

The make-and-break device is disposed upon a metallic plate 39 secured on the front-portion 1a of the casing. On said plate is secured a metallic sector 40 electrically insulated from the plate and to which is brought the connection 22 bringing the primary current. The sector carries two platinum tipped screws 41 and 42 (Fig. 2) cooperating with two circuit-breaking arms 43, 44 pivoting on axles 45 and 46 which connect them electrically to the earthed plate 39. The said arms are oscillated by a cam 47 keyed to the end of the hub 24 of the internally toothed wheel 25a. In the example described, the cam has three flat parts, and its lubrication is assured, for example, by a wick lubricator 48 (Fig. 1).

The make-and-break device is shunted by a condenser 49 (Fig. 1) which may be of any usual type affording a minimum size. This condenser is contained, for instance, in the cover 20; one of its terminals is connected to earth by the connection 50 (Fig. 4), the other terminal being connected by the strip 51 to the said sector 40.

The operation is as follows: the rotation of the field magnet causes variations of flux which are manifested in the stationary armature by variations of the primary current proceeding to the make-and-break devices, and hence by variations of the secondary current proceeding to brush 26 of the brush-holder 23. As already stated, the magneto shown in the drawings is arranged, by way of example, in view of its use on a four-cycle explosion engine with six cylinders. In such an engine, it is necessary, in order to produce the explosions in the six cylinders, to have six sparks produced by six variations of flux. Since one revolution of the field magnet produces four variations of flux, it is necessary to have a revolution and a half of the field magnet in order to obtain six variations. In the four-stroke cycle, six sparks correspond to two revolutions of the engine crank shaft and the field magnet must make three-quarters of a revolution for one revolution of the engine shaft, which will determine the ratio of transmission between the engine and the magneto. On the other hand, each rotation of the brush-holder 23 corresponds to one revolution of the cam 47 which rotates therewith. The cam produces three breaks at the make-and-break device 43, and three at the make-and-break device 44, the cam and brush-holder must thus make one revolution for two revolutions of the engine shaft that is, for one revolution and a half of the field magnet. For one revolution of the field magnet, the cam must therefore make two-thirds of a revolution, thus determining the ratio of the set of gearing constituted by the pinion 12 and the internally toothed wheel 25a. A like reasoning will permit to determine the ratios of transmission in the case of an engine of another kind.

Figures 8 and 9 represent a modification of the construction of the field magnet. As shown in said figures, the permanent magnet 52 is a solid bar of square section; the laminated poles 53 are centered on its ends and held in place by two cheeks 54 and 55 each carrying a trunnion of non-magnetic steel 54a, 55a. The cheeks are connected by bolts 56 (Fig. 9) tangent to the faces of the square, in order that the general size shall not exceed the diagonal of the cross section of the bar.

Figs. 10 and 11 show another modification in which the magnet is formed by two parts 57 and 58 assembled according to a diametrical plane and held in place by the pole-pieces and the cheeks.

The aforesaid disposition offer several advantages: the rotating magnet having the form of a bar can be very easily obtained and machined; it also permits to construct the rotating field magnet in a very simple manner. Also, the arrangement employed permits the use of a double make-and-break device operated by a single cam. By the use of a set of gearing of the inner wheel type, the size of the magneto may be reduced in height, and the weight of the machine is also reduced. The use of a cross piece for the insertion of the connecting wires dispenses with all external connections. The cam controlling the arms of the make-and-break devices is quite accessible, and the adjusting of the platinum-tipped screws is also very easy.

Obviously, the invention is by no means limited to the forms of construction represented and described, which have been chosen only by way of example, and thus one will not depart from the invention by giving to the permanent magnet any section or character permitting an easier construction or a greater efficiency.

Having now described my invention what I claim as new and desire to secure by Letters Patent is:

1. A magneto electric machine comprising in combination a rotary field member, a stationary armature, a rotary distributor for the high tension current produced by the armature, said distributor being placed end to end with the field member and having its axis out of alignment with the axis of the field member, an internally toothed wheel on the distributor and a pinion carried by the rotary field member at one end thereof and in meshing engagement with said wheel.

2. A magneto electric machine comprising in combination: a frame, a field member rotatably supported in said frame at both ends, a supporting shaft carried at one end in said frame, and having its axis out of alignment with the axis of the field member, a stationary armature, a distributor for the high tension current produced by the armature, means for rotatably supporting the distributor on said shaft, an internally toothed wheel on the distributor and a pinion carried by the field member at one end thereof and in meshing engagement with said wheel.

3. A magneto electric machine comprising in combination: a frame, a field member rotatably supported in said frame at both ends, a supporting shaft carried at one end on said frame and having its axis out of alignment with the axis of the field member, a stationary armature, make-and-break devices in the circuit of the primary current produced by said armature, a distributor for the secondary current produced by said armature, means for rotatably supporting the distributor on the aforesaid shaft, an internally toothed wheel on the distributor, a pinion on said field member in meshing engagement with said wheel, and a cam on the distributor, adapted to cooperate with the said make-and-break devices.

4. In a magneto electric machine, provided with a primary winding, a make-and-break device comprising in combination a rotatable camp provided with a number of bosses alternating with the same number of depressions, two pivoting arms electrically connected with one end of said primary winding and adapted to contact with said bosses and depressions of said cam and positioned in such manner that one arm is contacting with a boss when the other arm is contacting with a depression, two stationary contact pieces connected with the other end of said primary winding and adapted to be engaged by said arms when said arms are contacting with said depressions, whereby the two pivoting arms produce alternately a closing followed by an opening of the primary circuit.

In testimony whereof I have signed my name to this specification.

JEAN MARIE HEINRICH.